United States Patent
Knörle

(10) Patent No.: US 10,040,685 B2
(45) Date of Patent: Aug. 7, 2018

(54) APPARATUS FOR THE EXTRACTION OF PHOSPHORUS FROM WASTEWATER

(71) Applicant: Eliquo Stulz GmbH, Grafenhausen (DE)

(72) Inventor: Ulrich Knörle, Waldburg (DE)

(73) Assignee: Eliquo Stulz GmbH, Grafenhausen (DE)

( * ) Notice: Subject to any disclaimer, the term of this patent is extended or adjusted under 35 U.S.C. 154(b) by 0 days.

(21) Appl. No.: 15/479,470

(22) Filed: Apr. 5, 2017

(65) Prior Publication Data

US 2017/0291816 A1 Oct. 12, 2017

(30) Foreign Application Priority Data

Apr. 8, 2016 (DE) .......................... 10 2016 004 080

(51) Int. Cl.

| | | |
|---|---|---|
| *C02F 1/20* | (2006.01) | |
| *C01B 25/04* | (2006.01) | |
| *C02F 1/38* | (2006.01) | |
| *C02F 1/52* | (2006.01) | |
| *C02F 1/66* | (2006.01) | |
| *C02F 1/68* | (2006.01) | |
| C02F 1/00 | (2006.01) | |
| C02F 101/10 | (2006.01) | |

(52) U.S. Cl.
CPC .............. *C01B 25/04* (2013.01); *C02F 1/20* (2013.01); *C02F 1/38* (2013.01); *C02F 1/5209* (2013.01); *C02F 1/5236* (2013.01); *C02F 1/66* (2013.01); *C02F 1/687* (2013.01); C02F 2001/007 (2013.01); C02F 2001/5218 (2013.01); C02F 2101/105 (2013.01); C02F 2209/06 (2013.01)

(58) Field of Classification Search
CPC ..... C01B 25/04; C02F 1/20; C02F 1/38; C02F 1/66
USPC .......................................................... 23/296
See application file for complete search history.

(56) References Cited

U.S. PATENT DOCUMENTS

2006/0196835 A1  9/2006  Shimamura

FOREIGN PATENT DOCUMENTS

| DE | 102007035910 B4 | 7/2009 |
|----|-----------------|--------|
| DE | 102011016826 A1 | 10/2012 |
| DE | 102011112780 A1 | 3/2013 |
| EP | 1496019 B1 | 1/2005 |
| EP | 1786733 B1 | 5/2007 |
| JP | H11-290863 A | 10/1999 |
| JP | 2002 370094 A | 12/2002 |
| WO | WO 2005/077834 A1 | 8/2005 |
| WO | WO 2008/115758 A1 | 9/2008 |
| WO | WO 2012/119260 A1 | 9/2012 |
| WO | WO 2013/034765 A1 | 3/2013 |
| WO | WO 2014/003554 A1 | 1/2017 |

*Primary Examiner* — Edward Johnson
(74) *Attorney, Agent, or Firm* — ProPat, L.L.C.

(57) ABSTRACT

An apparatus for the extraction of phosphorus from wastewater that includes a precipitation module and a retention module. The precipitation module includes a crystallization vessel, one or more inlets disposed in a lower region of the precipitation module and at least one outlet disposed in an upper region of the precipitation module. The retention module includes a sedimentation vessel, at least one inlet disposed in an upper region of the retention module and at least one outlet disposed in a lower region of the retention module. At least one outlet of the precipitation module is connected to at least one inlet of the retention module and at least one outlet of the retention module is connected to at least one inlet of the precipitation module. The volume VS of the sedimentation vessel is greater than/equal to 0.6 times the volume VC of the crystallization vessel (VS≥0.6·VC).

15 Claims, 7 Drawing Sheets

APPARATUS FOR THE EXTRACTION OF PHOSPHORUS FROM WASTEWATER

CROSS-REFERENCE TO RELATED APPLICATIONS

This application claims priority to German Patent Application No. 10 2016 004 080.7 filed Apr. 8, 2016, which is hereby incorporated herein by reference in its entirety.

FIELD OF THE INVENTION

The present invention relates to an apparatus for the extraction of phosphorus from wastewater, comprising a precipitation module and a retention module, wherein the precipitation module comprises a crystallization vessel, one or more inlets disposed in a lower region of the precipitation module and at least one outlet disposed in an upper region of the precipitation module, the retention module comprises a sedimentation vessel, at least one inlet disposed in an upper region of the retention module and at least one outlet disposed in a lower region of the retention module, at least one outlet of the precipitation module is connected to at least one inlet of the retention module and at least one outlet of the retention module is connected to at least one inlet of the precipitation module.

The invention additionally relates to a method for the extraction of phosphorus from wastewater, comprising the steps of precipitating phosphorus-containing precipitate in a crystallization vessel in an upward wastewater flow, sedimenting precipitate in a sedimentation vessel in a downward wastewater flow, and recycling wastewater and precipitate from the sedimentation vessel into the crystallization vessel.

The apparatus and the method of the present invention are suitable for the purpose of treating wastewater, untreated sludge, stabilized sewage sludge, digested sludge and sludge centrate. More particularly, the apparatus of the invention and the method are intended for the treatment of stabilized sewage sludge and digested sludge having a high dry matter content (referred to here and hereinafter as DM) of up to 7%.

BACKGROUND OF THE INVENTION

Phosphorus is one of the raw materials which, at present, looks likely to be subject to severe scarcity in the foreseeable future. This has been recognized by the German Federal Government, which therefore stipulated the following in the coalition agreement: "The protection of water bodies from nutrient inputs and pollutants is to be enhanced and put in a legal framework such that undesirable trends are corrected. We will end the deployment of sewage sludge for fertilization purposes and recover phosphorus and other nutrients." (CDU, 2013). The fact that phosphorus recovery is indeed justified is shown by the fact that estimated world reserves in 1979 were still 50 billion tonnes, which at the rate of consumption at the time corresponded to an availability of 500 years. According to 2012 estimates, the lifetime of exploitable deposits is about 100 years (Ehbrecht, Fuderer, Schönauer, & Schuhmann, 2012).

The recovery of phosphorus in the communal and industrial wastewater and sludge treatment sector can proceed either from the aqueous phase, from the sludge or from the ashes after sewage sludge incineration. The method claimed here and the apparatus claimed for performance of the method have the aim of recovering phosphorus from the aqueous phase and from the sludge in the form of magnesium ammonium phosphate (MAP, struvite).

Apparatuses and methods for the extraction of phosphorus from wastewater are known in the prior art.

In some cases, MAP crystallization is promoted using sand or other minerals (CRYSTALACTOR® process). In the P-RoC process (DE102011016826A1), phosphate-containing mineral phases are crystallized on the surface of porous calcium silicate hydrate (CSH) substrates as crystallization substrate. The phosphorus present in the substrate is recovered in the form of calcium phosphate.

EP1496019 discloses a method and an apparatus for the recovery of phosphate in the form of MAP crystals from wastewater, in which the wastewater contains high concentrations of organic matter, phosphorus and nitrogen. This treatment process includes the biological treatment of a sludge/water mixture, wherein MAP crystals are formed with simultaneous dosage of a magnesium source and they are induced to grow. After the MAP crystals have been separated from the reactor circulation, at least a portion of the sludge is returned back to the reactor. As well as the phosphorus recovery, this method also simultaneously reduces the organic burden.

WO2014/003554A1 teaches an anaerobic reactor for production and collection of struvite with inlets arranged at the top of the reactor and an outlet at the base, wherein the inlets are configured such that a rotary movement of the reactor contents is generated as the reactor is charged, and the struvite formed is moved toward the outlet by means of scrapers at the base.

EP 1786733B1 also teaches a method which, as well as the recovery of phosphorus, has the aim of degrading the organic burden. In this method, the process proceeds under aerobic conditions, with minimization of the growth of nitrifying bacteria through the choice of a suitable hydraulic residence time, in order thus to have the ammonium co-reactant required for the crystallization of magnesium ammonium phosphate available in a sufficient concentration or not to utilize it in any other way.

WO2008/115758A1 discloses a method for the removal of phosphorus and ammonium from an aqueous stream. The phosphorus-containing aqueous stream is contacted with alkali and magnesium in two to five stages connected in series, and the precipitation of struvite is thus initiated. The struvite is drawn off at the base of each stage and introduced into the preceding stage. The phosphorus-containing aqueous stream is conducted from the first to the last stage in countercurrent. The individual stages feature a rising pH compared to the preceding stage, the pH being increased by the metered addition of alkali.

DE102007035910B4 discloses a method and an apparatus for recovery of magnesium ammonium phosphate in sewage sludge treatment. The apparatus consists of a reaction vessel into which digested sludge is introduced, and the latter is mixed with air. Addition of magnesium chloride initiates the precipitation of magnesium ammonium phosphate. The introduction of air firstly strips out the $CO_2$ dissolved in the digested sludge and thus raises the pH. It is known that the precipitation reaction proceeds more readily at higher pH values. At the same time, the introduction of air creates characteristic flow conditions which enable collection of the heavy MAP particles in a calming zone, from which they can be removed from the system.

DE102011112780A1 discloses a method of treatment of sewage sludge having the treatment steps of hydrolysis of the sewage sludge and the digestion of the hydrolysed sewage sludge that has been subjected to the hydrolysis for anaerobic treatment of the sewage sludge, and having a step of separation of phosphate from the at least partly treated sewage sludge. The separation of phosphate follows the treatment step of hydrolysis and precedes the treatment step of digestion of the hydrolysed sewage sludge, and the sewage sludge having a phosphate content reduced by the separation of phosphate is sent to the anaerobic treatment by digestion.

WO 2005/077834 A describes a fluidized bed reactor for wastewater, comprising a reaction tank having three or more regions arranged one on top of another, the cross-sectional area of which increases from the bottom upward, a recirculation loop and a control system for the regulation of the chemical saturation conditions in the lower region of the reaction tank.

WO 2012/119260 A1 relates to a system for the treatment of wastewater having a reactor tank having three or more regions arranged one on top of another, wherein the cross-sectional area of the regions increases from the bottom upward, and wastewater is supplied in a lower region and is recirculated in the reactor tank.

JP H11-290863 A discloses an apparatus for the separation of phosphorus from wastewater having a reactor tank for the precipitation of MAP crystals (magnesium ammonium phosphate crystals), wherein an image sensor, especially a CCD camera, disposed in the reactor tank is used to determine the size and suspension of MAP crystals.

The known apparatuses and methods have one or more of the following disadvantages:
  considerable flushing-out of phosphorus-containing fine crystals;
  low degree of phosphorus extraction, i.e. only a small proportion of less than 50% of the phosphorus present in the wastewater is extracted;
  only wastewater having a low dry matter content DM<3%, such as sludge centrate in particular, is treated;
  use of maintenance-intensive flow-oriented plant components;
  restrictions in the choice of operating parameters;
  elevated energy consumption.

SUMMARY OF ADVANTAGEOUS EMBODIMENTS OF THE INVENTION

The problem addressed by the present invention is that of providing an apparatus which permits extraction of phosphorus from wastewater having a dry matter content of up to 7%. More particularly, the apparatus is to extract more than 50% of the phosphorus present in the wastewater with low energy consumption. This problem is solved by an apparatus comprising a precipitation module and a retention module, wherein the precipitation module comprises a crystallization vessel, one or more inlets disposed in a lower region of the precipitation module and at least one outlet disposed in an upper region of the precipitation module, the retention module comprises a sedimentation vessel, at least one inlet disposed in an upper region of the retention module and at least one outlet disposed in a lower region of the retention module, at least one outlet of the precipitation module is connected to at least one inlet of the retention module and at least one outlet of the retention module is connected to at least one inlet of the precipitation module, wherein the volume VS of the sedimentation vessel is at least 60% of the volume VC of the crystallization vessel (VS≥0.6·VC).

Advantageous embodiments of the apparatus of the invention are characterized in that the precipitation module comprises a feed for wastewater fed in from the outside, the feed being equipped with a fluid drive controllable by closed-loop control;

the retention module comprises a drain for wastewater removed to the outside, the drain being equipped with a fluid drive controllable by closed-loop control;

the apparatus comprises an aerator for the introduction of air into the wastewater;

the aerator comprises a fan or a compressor;

the aerator comprises one or more outlet nozzles, the at least one outlet nozzle taking the form of a fine-pore membrane and preferably consisting of a ceramic or metallic material;

the aerator comprises one or more outlet nozzles, the at least one outlet nozzle taking the form of a fine-pore membrane and having pores having a diameter of ≤1000 µm, ≤500 µm or ≤100 µm;

the aerator comprises one or more outlet nozzles, the at least one outlet nozzle being disposed in a conduit for the supply of wastewater from the precipitation module to the retention module;

the aerator is connected to a conduit for the supply of wastewater from the crystallization vessel to the sedimentation vessel;

the aerator comprises one or more outlet nozzles, the at least one outlet nozzle being disposed in a conduit for the supply of wastewater from the crystallization vessel to the sedimentation vessel;

the aerator is connected to the crystallization vessel and/or to the sedimentation vessel;

the aerator comprises one or more outlet nozzles, the at least one outlet nozzle being disposed in the crystallization vessel and/or in the sedimentation vessel;

the aerator comprises one or more outlet nozzles, the at least one outlet nozzle being disposed in the sedimentation vessel;

the aerator is set up to introduce air bubbles having an equivalent diameter of ≤10 mm, ≤6 mm, ≤2 mm or ≤1 mm into the wastewater;

the ratio of the volume VS of the sedimentation vessel to the volume VC of the crystallization vessel is greater than/equal to 0.8 (VS/VC≥0.8), greater than/equal to 1 (VS/VC≥1) or greater than/equal to 1.2 (VS/VC≥1.2);

the ratio of the volume VS of the sedimentation vessel to the volume VC of the crystallization vessel is greater than/equal to 2 (VS/VC≥2), greater than/equal to 3 (VS/VC≥3) or greater than/equal to 4 (VS/VC≥4);

the ratio of the volume VS of the sedimentation vessel to the volume VC of the crystallization vessel is between 0.6 and 10 (0.6≤VS/VC≤10);

the crystallization vessel has a volume of 10 to 1000 m$^3$;

the sedimentation vessel has a volume of 6 to 2000 m$^3$;

a maximum cross-sectional area QS of the sedimentation vessel is greater than/equal to a maximum cross-sectional area QC of the crystallization vessel (QS≥QC);

the ratio of the maximum cross-sectional area QS of the sedimentation vessel to the maximum cross-sectional area QC of the crystallization vessel is greater than/equal to 1.2 (QS/QC≥1.2), greater than/equal to 1.4 (QS/QC≥1.4) or greater than/equal to 1.6 (QS/QC≥1.6);

the ratio of the maximum cross-sectional area QS of the sedimentation vessel to the maximum cross-sectional area QC of the crystallization vessel is greater than/equal to 2 (QS/QC≥2), greater than/equal to 3 (QS/QC≥3) or greater than/equal to 4 (QS/QC≥4);

the ratio of the maximum cross-sectional area QS of the sedimentation vessel to the maximum cross-sectional area QC of the crystallization vessel is between 1 and 10 (1≤QS/QC≤10);

the crystallization vessel has a maximum cross-sectional area of 7 to 120 m$^2$;

the sedimentation vessel has a maximum cross-sectional area of 7 to 180 m$^2$;

the crystallization vessel is equipped with one or more inlets;

the crystallization vessel is equipped with one or more outlets;

the crystallization vessel is equipped with an inlet for wastewater;

the crystallization vessel is equipped with an inlet for wastewater recycled from the retention module;

the crystallization vessel is equipped with an inlet for a magnesium-containing reagent, such as magnesium chloride (MgCl$_2$);

the crystallization vessel is equipped with an inlet for a basic reagent, such as sodium hydroxide solution (NaOH);

the crystallization vessel is equipped with an outlet for the draining of wastewater into the retention module;

the crystallization vessel is cylindrical in shape;

the crystallization vessel has a lower conical section and an upper cylindrical section;

the sedimentation vessel is equipped with one or more inlets;

the sedimentation vessel is equipped with one or more outlets;

the sedimentation vessel is equipped with an inlet for wastewater removed from the precipitation module;

the sedimentation vessel is equipped with an inlet for wastewater removed from the precipitation module and an outlet for the draining of wastewater, the inlet and the outlet being disposed in an upper region of the sedimentation vessel and the inlet being disposed at a lower level than the outlet;

the sedimentation vessel is equipped with an outlet for the recycling of wastewater into the precipitation module;

the sedimentation vessel is equipped with an outlet for the draining of wastewater into a hydrocyclone;

the sedimentation vessel is equipped with an inlet for the introduction of a wastewater fraction separated in a hydrocyclone;

the sedimentation vessel is cylindrical in shape;

the sedimentation vessel has a lower conical section and an upper cylindrical section;

an outlet of the retention module is connected via a recycle conduit to at least one inlet of the precipitation module and the recycle conduit is equipped with a fluid drive;

the fluid drive of the recycle conduit is controllable by electronic closed-loop control;

the fluid drive of the recycle conduit takes the form of a pump;

the apparatus comprises a discharge device, arranged below the precipitation module, for the withdrawal of phosphorus-containing precipitate from the precipitation module;

the discharge device is arranged beneath and connected to the crystallization vessel, the connection between the discharge device and the crystallization vessel being equipped with an electrically or pneumatically adjustable valve;

the discharge device comprises a mechanical conveying device, for example a conveying screw;

the discharge device comprises a hydraulic conveying device, especially a sluice chamber;

the sluice chamber is connected to a reservoir for wash water for the cleaning of phosphorus-containing precipitate;

a lower region of the sluice chamber is conical in shape;

the precipitation module comprises a mixing vessel arranged beneath and connected to the crystallization vessel;

the mixing vessel is equipped with one or more inlets;

the mixing vessel is equipped with one or more outlets;

the mixing vessel is equipped with an inlet for wastewater;

the mixing vessel is equipped with an outlet for the introduction of wastewater into the crystallization vessel;

the mixing vessel is equipped with an inlet for wastewater recycled from the retention module;

the mixing vessel is equipped with an inlet for a magnesium-containing reagent, such as magnesium chloride (MgCl$_2$);

the mixing vessel is equipped with an inlet for a basic reagent, such as sodium hydroxide solution (NaOH);

the mixing vessel is equipped with an outlet for the draining of phosphorus-containing precipitate into the discharge device;

the discharge device is arranged beneath and connected to the mixing vessel, the connection between the discharge device and the mixing vessel being equipped with an electrically or pneumatically adjustable valve;

the apparatus comprises a gas separator connected via a feed conduit to at least one inlet of the precipitation module;

the gas separator is equipped with an inlet for wastewater;

the gas separator is equipped with an outlet for degassed wastewater;

the apparatus comprises a gas separator with an inlet for wastewater and an outlet for degassed wastewater, wherein the outlet for degassed wastewater is connected via one or more feed conduits to at least one inlet of the precipitation module;

the gas separator takes the form of a vacuum degasser and comprises a reduced pressure vessel connected to a vacuum pump or a blower;

the gas separator takes the form of an aeration vessel and is equipped with one or more aeration nozzles disposed in a lower region oft the aeration vessel;

the gas separator takes the form of an aeration vessel and comprises a blower and one or more aeration nozzles that are connected to the blower and disposed in a lower region of the aeration vessel;

the gas separator takes the form of a stirred vessel or trickle column;

the apparatus comprises a vacuum degasser and an aeration vessel, wherein the vacuum degasser comprises an inlet for wastewater and an outlet for degassed wastewater, the outlet of the vacuum degasser is connected to an inlet of the aeration vessel and an outlet of the aration vessel is connected to at least one inlet of the precipitation module via one or more feed conduits;

the apparatus comprises an aeration vessel and a vacuum degasser, wherein the aeration vessel comprises an inlet for wastewater and an outlet for degassed wastewater, the outlet of the aeration vessel is connected to an inlet of the vacuum degasser and an outlet of the vacuum degasser is connected to at least one inlet of the precipitation module via one or more feed conduits;

the feed conduit from the gas separator to the precipitation module is equipped with a fluid drive controllable by electronic closed-loop control;

the retention module comprises a hydrocyclone, wherein an inlet of the hydrocyclone is connected to an outlet disposed in an upper region of the sedimentation vessel and an outlet of the hydrocyclone is connected to an inlet disposed in a lower region of the sedimentation vessel, to the recycle conduit or to an inlet of the precipitation module;

a connection between the outlet of the sedimentation vessel and the inlet of the hydrocyclone is equipped with a fluid drive;

an outlet of the hydrocyclone is connected to an inlet disposed in a lower region of the sedimentation vessel;

an outlet of the hydrocyclone is connected to the recycle line;

an outlet of the hydrocyclone is connected to an inlet of the precipitation module;

the apparatus comprises a reservoir vessel for a magnesium-containing reagent, for example magnesium chloride ($MgCl_2$), the reservoir vessel being connected to an inlet of the precipitation module and the connection between the reservoir vessel and the precipitation module being equipped with a metering device, for example with a metering pump;

the apparatus comprises a reservoir vessel for a basic reagent, for example sodium hydroxide (solution) (NaOH), the reservoir vessel being connected to an inlet of the precipitation module and the connection between the reservoir vessel and the precipitation module being equipped with a metering device, for example with a metering pump;

the crystallization vessel being equipped with at least one sensor for the measurement of the precipitate content in the wastewater;

the sensor for the measurement of the precipitate content takes the form of an ultrasound sensor;

the sensor for the measurement of the precipitate content takes the form of a radar sensor;

the crystallization vessel is equipped with a sensor for the measurement of the phosphate content in the wastewater;

the sedimentation vessel is equipped with a sensor for the measurement of the phosphate content in the wastewater;

the crystallization vessel is equipped with a sensor for the measurement of the pH of the wastewater;

the sedimentation vessel is equipped with a sensor for the measurement of the pH of the wastewater;

the crystallization vessel is equipped with a temperature sensor for the measurement of the temperature of the wastewater;

the sedimentation vessel is equipped with a temperature sensor for the measurement of the temperature of the wastewater;

the apparatus comprises an electronic control system;

the control system takes the form of a programmable logic controller (PLC) or of a PC-based programmable logic controller (soft-PLC);

the electronic control system comprises one or more inputs for sensors for the measurement of the precipitate content, the phosphate content, the pH and/or the temperature of the wastewater;

the electronic control system comprises one or more outputs for the actuation of fluid drives, pumps, metering devices, valves and mechanical components, for example a conveying screw;

the electronic control system is set up to control the volume flow rate of the wastewater supplied to the apparatus from the outside;

the electronic control system is set up to control the volume flow rate of the wastewater removed from the apparatus to the outside;

the electronic control system is set up to control the volume flow rate of the wastewater recycled from the retention module into the precipitation module;

the electronic control system is set up to control the withdrawal of precipitate from the precipitation module with reference to the precipitate content in the crystallization vessel;

the electronic control system is set up to control the withdrawal of precipitate from the precipitation module with reference to the phosphate content in the wastewater;

the electronic control system is set up to control the withdrawal of precipitate from the precipitation module with reference to the pH of the wastewater;

the electronic control system is set up to control the withdrawal of precipitate from the precipitation module with reference to the phosphate content and the pH of the wastewater;

the electronic control system is set up to control the supply and dosage of a magnesium-containing reagent from the reservoir vessel to the precipitation module; and/or the electronic control system is set up to control the supply and dosage of a basic reagent from the reservoir vessel to the precipitation module.

A further problem addressed by the present invention is that of providing a method which permits extraction of phosphorus from wastewater having a dry matter content of up to 7%. More particularly, the method is to extract more than 50% of the phosphorus present in the wastewater with low energy consumption. This problem is solved by a method comprising the steps of precipitating phosphorus-containing precipitate in a crystallization vessel in an upward wastewater flow, sedimenting precipitate in a sedimentation vessel in a downward wastewater flow, and recycling wastewater and precipitate from the sedimentation vessel into the crystallization vessel, wherein the hydraulic residence time tS of the wastewater in the sedimentation vessel is greater than/equal to 0.6 times the hydraulic residence time tC of the wastewater in the crystallization vessel ($tS \geq 0.6 \cdot tC$).

Advantageous embodiments of the method of the invention are characterized in that the ratio of the hydraulic residence time tS in the sedimentation vessel to the hydraulic residence time tC in the crystallization vessel is greater than/equal to 0.8 ($tS/tC \geq 0.8$), greater than/equal to 1.0 ($tS/tC \geq 1.0$) or greater than/equal to 1.2 ($tS/tC \geq 1.2$);

the ratio of the hydraulic residence time tS in the sedimentation vessel to the hydraulic residence time tC in the crystallization vessel is greater than/equal to 2 ($tS/tC \geq 2$), greater than/equal to 3 ($tS/tC \geq 3$) or greater than/equal to 4 ($tS/tC \geq 4$);

the ratio of the hydraulic residence time tS in the sedimentation vessel to the hydraulic residence time in the crystallization vessel tC is between 0.6 and 10 ($0.6 \leq tS/tC \leq 10$);

the hydraulic residence time tC in the crystallization vessel is 2 to 24 hours;

the hydraulic residence time tS in the sedimentation vessel is 1.2 to 36 hours;

the ratio of the minimum rate RC of upward wastewater flow in the crystallization vessel to the minimum rate RS of downward wastewater flow in the sedimentation vessel is greater than/equal to 1 (RC/RS≥1), greater than/equal to 2 (RC/RS≥2), greater than/equal to 3 (RC/RS≥3) or greater than/equal to 4 (RC/RS≥4);

the ratio of the minimum rate RC of upward wastewater flow in the crystallization vessel to the minimum rate RS of downward wastewater flow in the sedimentation vessel is between 1 and 10 (1≤RC/RS≤10);

in steady-state operation, the minimum rate RC of upward wastewater flow in the crystallization vessel is 0.5 m/h to 10 m/h;

in steady-state operation, the minimum rate RS of downward wastewater flow in the sedimentation vessel is 0.5 m/h to 10 m/h;

the volume flow rate of the wastewater supplied to the apparatus from the outside is controlled by closed-loop control by means of an electronic control system and a fluid drive connected to the control system;

the volume flow rate of the wastewater removed from the apparatus to the outside is controlled by closed-loop control by means of an electronic control system and a fluid drive connected to the control system;

the volume flow rate of the wastewater recycled from the retention module into the precipitation module is controlled by closed-loop control by means of an electronic control system and a fluid drive connected to the control system;

the ratio of the volume flow rate of the wastewater recycled from the sedimentation vessel into the crystallization vessel to the volume flow rate of the wastewater supplied to the apparatus from the outside is 2 to 100;

the ratio of the volume flow rate of the wastewater recycled from the sedimentation vessel into the crystallization vessel to the volume flow rate of the wastewater supplied to the apparatus from the outside is 2 to 15, 10 to 30, 20 to 40, 30 to 50, 40 to 60, 50 to 70, 60 to 80, 70 to 90 or 80 to 100;

prior to introduction into the crystallization tank the wastewater is degassed by vacuum degassing and/or aeration;

prior to introduction into the crystallization tank the wastewater is degassed in a stirring vessel or trickle column;

an aerator is used to introduce air, preferably in the form of air bubbles, into the wastewater;

an aerator is used to introduce air, preferably in the form of air bubbles, into the wastewater guided in a connecting conduit from the precipitation module to the retention module;

an aerator is used to introduce air, preferably in the form of air bubbles, into the wastewater guided in a connecting conduit from the crystallization vessel to the sedimentation vessel;

an aerator is used to introduce air, preferably in the form of air bubbles, into the wastewater present in the crystallization vessel and/or into the wastewater present in the sedimentation vessel;

an aerator is used to introduce air, preferably in the form of air bubbles, into the wastewater present in the sedimentation vessel;

the air bubbles introduced into the wastewater have an equivalent diameter of ≤10 mm, ≤6 mm, ≤2 mm or ≤1 mm;

the ratio of the volume flow rate of the air introduced into the wastewater to the volume flow rate of the wastewater supplied to the apparatus from the outside is 0.02 to 20;

the ratio of the volume flow rate of the air introduced into the wastewater to the volume flow rate of the wastewater supplied to the apparatus from the outside is 0.02 to 0.25; 0.2 to 0.6; 0.4 to 0.8; 0.6 to 1.0; 0.8 to 1.2; 1.0 to 1.4; 1.2 to 1.6; 1.4 to 1.8 or 1.6 to 2.0;

the wastewater volume recycled from the sedimentation vessel into the crystallization vessel per unit time is varied by means of a fluid drive controllable by closed-loop control;

the precipitate content of the wastewater present in the crystallization vessel is measured and, depending on the measured precipitate content, the wastewater volume recycled from the sedimentation vessel into the crystallization vessel per unit time is varied by means of a fluid drive controllable by closed-loop control;

the precipitate content of the wastewater is measured in the crystallization vessel and precipitate is withdrawn from the crystallization vessel as a function of the precipitate content measured;

the precipitate content of the wastewater in the crystallization vessel is measured continuously and, on attainment of a defined upper limit, a defined amount of precipitate is withdrawn from the crystallization vessel;

the precipitate content of the wastewater in the crystallization vessel is measured continuously and, on attainment of a defined upper limit, precipitate is withdrawn continuously from the crystallization vessel until a defined lower limit is attained;

the precipitate content of the wastewater in the crystallization vessel is measured by means of an ultrasound sensor or by means of a microwave sensor;

the precipitate content of the wastewater in the crystallization vessel is determined by measuring the position of a phase boundary or a separation layer between wastewater and wastewater sediment;

the precipitate content of the wastewater in the crystallization vessel is measured with reference to the travel time of ultrasound pulses which are reflected by a phase boundary or a separation layer between wastewater and wastewater sediment;

the pH of the wastewater present in the crystallization vessel or in the sedimentation vessel is measured;

the phosphate content of the wastewater present in the crystallization vessel or in the sedimentation vessel is measured;

a basic reagent, for example sodium hydroxide solution (NaOH), is metered into wastewater which is supplied to the crystallization vessel;

a magnesium-containing reagent, for example magnesium chloride ($MgCl_2$), is metered into wastewater which is supplied to the crystallization vessel;

the pH of the wastewater present in the crystallization vessel or in the sedimentation vessel is measured and, as a function of the pH, a basic reagent, for example sodium hydroxide solution (NaOH), is metered into wastewater which is supplied to the crystallization vessel;

the pH of the wastewater present in the crystallization vessel or in the sedimentation vessel is measured and, as a function of the pH, a magnesium-containing reagent, for example magnesium chloride (MgCl$_2$), is metered into wastewater which is supplied to the crystallization vessel;

the phosphate content of the wastewater present in the crystallization vessel or in the sedimentation vessel is measured and, as a function of the pH, a basic reagent, for example sodium hydroxide solution (NaOH), is metered into wastewater which is supplied to the crystallization vessel;

the phosphate content of the wastewater present in the crystallization vessel or in the sedimentation vessel is measured and, as a function of the pH, a magnesium-containing reagent, for example magnesium chloride (MgCl$_2$), is metered into wastewater which is supplied to the crystallization vessel;

the wastewater present in the crystallization vessel has a dry matter content DM of 1.5% to 7% (1.5%≤DM≤7%);

the wastewater present in the crystallization vessel has a dry matter content DM of 1.5% to 4% (1.5%≤DM≤4%), 3% to 5% (3%≤DM≤5%), of 4% to 6% (4%≤DM≤6%) or of 5% to 7% (5%≤DM≤7%);

the wastewater present in the sedimentation vessel has a dry matter content DM of 3% to 7% (3%≤DM≤7%); and/or the wastewater present in the sedimentation vessel has a dry matter content DM of 1.5% to 5% (1.5%≤DM≤5%), of 4% to 6% (4%≤DM≤6%) or of 5% to 7% (5%≤DM≤7%).

The dry matter content DM of wastewater, untreated sludge, sewage sludge, digested sludge or sludge centrate is determined by the Deutsche Einheitsverfahren zur Wasser-, Abwasser- and Schlammuntersuchung [German standard methods for analysis of water, wastewater and sludge]. Alternatively, the dry matter content DM of wastewater, untreated sludge, sewage sludge, digested sludge or sludge centrate can be determined by taking a sample of a given volume (for example 100 ml) and weighing it on an analytical balance, defining the weight of the sample as $m_S$ (unit [mg]);

weighing a clean filter stored in a drying cabinet and a desiccator on an analytical balance, defining the weight of the clean filter as $m_F$ (unit [mg]);

filtering the sample through the filter and drying the filter in a microwave or a drying cabinet or by means of infrared light;

weighing the filter again, defining the weight of the filter with the dry matter deposited thereon as $m_{FT}$ (units [mg]);

calculating the dry matter content DM in units of % from the ratio $(m_{FT}-m_F)/m_S$ multiplied by a factor of 100.

In general, communal wastewater, agricultural wastewater and wastewater from animal keeping is first freed of coarse particulate ingredients by mechanical means, such as rakes, metallic filter grids and/or a sand trap. Subsequently, the mechanically clarified wastewater is sent to an aerobic clarifier and subjected to biological conversion over a period of time of a few hours up to a few days. The sewage sludge (untreated sludge) obtained after aerobic treatment is digested in a digestion tower and is then referred to as anaerobic stabilized sewage sludge, or as digested sludge. Mechanical overflow and filter apparatuses, presses or centrifuges, optionally in conjunction with thermal breakdown, are used to separate stabilized sewage sludge and digested sludge into a thickened sludge component and a component having a low dry matter content of DM≤0.5%, called the sludge centrate.

In the context of the present invention:

wastewater, untreated sludge, stabilized sewage sludge, digested sludge and sludge centrate are encompassed by the umbrella term "wastewater";

the term "hydraulic residence time" refers to the ratio of the volume of a vessel through which wastewater flows—for example in units of m$^3$—to the volume flow rate (dV/dt) of the wastewater through the vessel—for example in the unit m$^3$/h; rather than "hydraulic residence time", skilled persons also use the terms "retention time" or "residence time";

the term "equivalent diameter" of a body refers to the diameter of a sphere which consists of the same material as the body in question and has the same volume as the body;

the term "median" value refers to a feature among an ensemble, especially an ensemble of particles, where the feature in question has a value greater than the median value for 50% of the members of the ensemble and the feature has a value less than/equal to the median value for the remaining 50% of the members of the ensemble;

the terms "phosphorus-containing precipitate" and "precipitate" refer to a mixture of phosphorus-containing crystals, for example struvite, other precipitates and "wastewater"; more particularly, the terms "phosphorus-containing precipitate" and "precipitate" refer to sediment formed in the crystallization vessel and in the sedimentation vessel;

the term "coarse grains" refers to precipitate containing phosphorus-containing crystals, where the median equivalent diameter of the crystals is ≥0.8 mm;

the term "fine grains" refers to precipitate containing phosphorus-containing crystals, where the median equivalent diameter of the crystals is <0.8 mm.

BRIEF DESCRIPTION OF THE DRAWINGS

The invention is elucidated hereinafter with reference to figures. The figures show.

DETAILED DESCRIPTION OF ADVANTAGEOUS EMBODIMENTS OF THE INVENTION

FIGS. 3 through 7 show illustrative configurations of the apparatus of the invention, on the basis of which the functioning of particular plant components is elucidated. However, the inventive embodiments of the apparatus are not restricted to the configurations shown in FIGS. 3 through 7. The apparatus is of modular construction and the invention encompasses further configurations of the plant components in question, as detailed below.

Figure 1A:
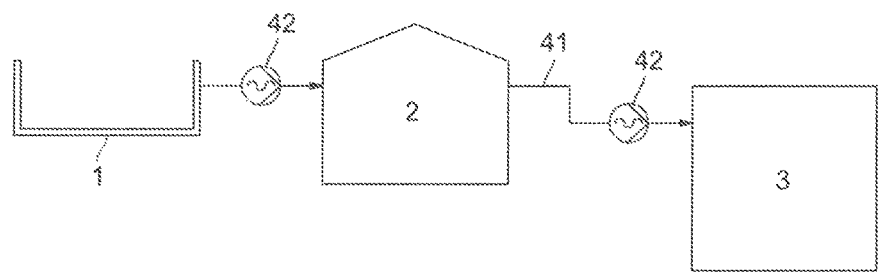
FIG. 1A is a block diagram which shows the connection of the apparatus of the invention to an exemplary conventional sewage treatment plant.
Figure 1B:
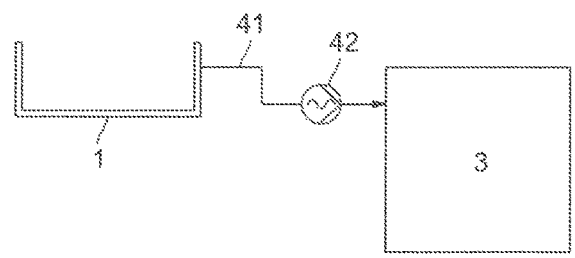
FIG. 1B is a block diagram which shows the connection of the apparatus of the invention to a different conventional sewage treatment plant.

FIG. 1A shows a block diagram of a sewage treatment plant with a clarifier 1 for the aerobic wastewater treatment, a digestion vessel 2 or digestion tower 2 for the anaerobic wastewater treatment and an inventive apparatus 3 for the phosphorus extraction, wherein the clarifier 1 is connected to the digestion tower 2 and the digestion tower 2 is connected to the apparatus 3 by fluidic means via conduits 41. For the purpose of conveying the wastewater, any of the connecting conduits 41 may be equipped with a fluid drive 42, preferably a screw pump 42.

FIG. 1A shows a block diagram of a different sewage treatment plant merely comprising an aerobic clarifier 1 and an inventive apparatus 3, wherein the clarifier 1 is connected to the apparatus 3 by fluidic means via a conduit 41 and the connecting conduit 41 is optionally equipped with a fluid drive 42, preferably with a screw pump 42. The aerobic sewage sludge (untreated sludge) supplied from the clarifier 1 is substantially free of carbon dioxide and has a pH of 7.5 to 8.5, and so a gas separator is not required in the inventive apparatus 3.

Figure 1C:
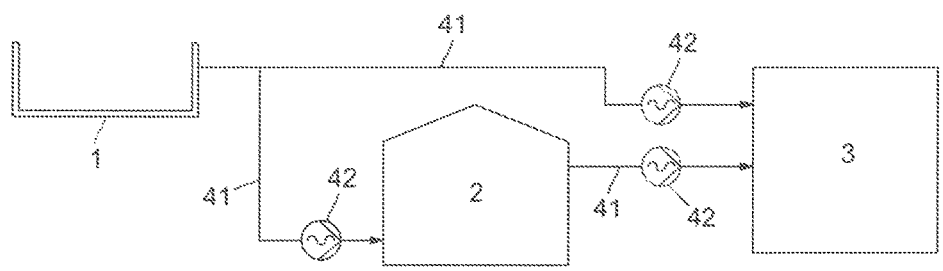
FIG. 1C is a block diagrams which shows the connection of the apparatus of the invention to another exemplary conventional sewage treatment plant.

FIG. 1C shows a further sewage treatment plant in which an aerobic clarifier 1 is connected to an anaerobic digestion tower 2 and an inventive apparatus 3, and the digestion tower 2 is connected to the apparatus 3, each via conduits 41. Accordingly, the inventive apparatus 3 is supplied simultaneously with wastewater from the aerobic clarifier 1 and the anaerobic digestion tower 2. Each of the connecting conduits 41 is optionally equipped with a fluid drive 42, preferably with a screw pump 42.

Figure 2:
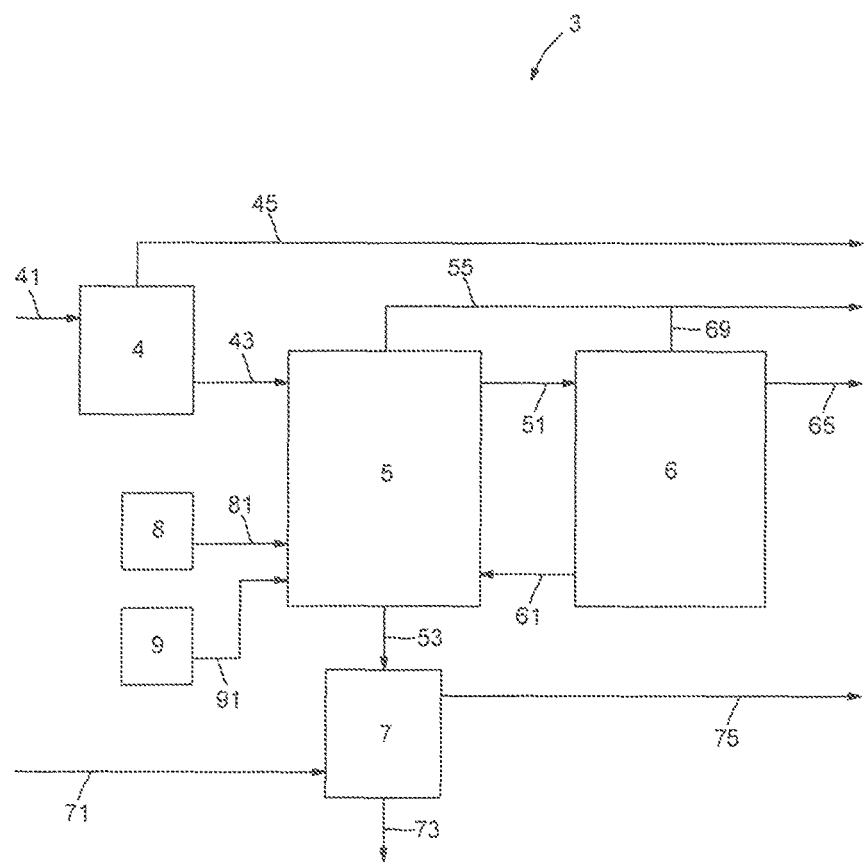
FIG. 2 is a block diagram of an apparatus of the invention with a gas separator and precipitation and retention module.

FIG. 2 shows a schematic block diagram of an inventive apparatus 3, comprising a gas separator 4, a precipitation module 5, a retention module 6, a discharge device 7, a supply unit 8 for a magnesium-containing reagent and a supply unit 9 for a basic reagent. Aerobically and/or anaerobically treated wastewater is supplied to the apparatus 3 or to the gas separator 4 from the outside via a conduit 41. In the gas separator 4, gases dissolved in the wastewater, especially carbon dioxide ($CO_2$), are separated and removed via a conduit 45. The separation of $CO_2$ increases the pH of the wastewater to a value of 7.5 to 8.5. The degassed wastewater is guided from the gas separator 4 via a conduit 43 into the precipitation module 5. In the precipitation module 5, phosphorus compounds present in the wastewater, especially water-soluble phosphates, are precipitated with addition of a magnesium-containing reagent, for example magnesium chloride ($MgCl_2$) and optionally a basic reagent, for example sodium hydroxide solution (NaOH), in the form of phosphorus-containing crystalline compounds, preferably in the form of magnesium ammonium phosphate crystals (MAP) or struvite crystals having the chemical formula $(NH_4)Mg[PO_4] \cdot 6H_2O$—referred to hereinafter as MAP or struvite. The magnesium-containing reagent is supplied to the precipitation module 5 from a supply unit 8 via a conduit 81. Optionally, the inventive apparatus 3 comprises a further supply unit 9 for the basic reagent which is connected to the precipitation module 5 via a conduit 91. If the wastewater fed in from the outside has a sufficiently high pH—as in the case of aerobic sewage sludge (untreated sludge)—the gas separator 4 is not required and can be dispensed with.

In the precipitation module 5, small phosphorus-containing crystal seeds are formed at first, which are referred to as fine grains or fine-grain crystals in the context of the invention. Under suitable stoichiometric conditions, the fine grains grow over a period of 10 to 24 hours to form crystals having a median equivalent diameter of 0.4 to 1 mm. Phosphorus-containing crystals having a median equivalent diameter of ≥0.8 mm are referred to as coarse grains or coarse-grain crystals in the context of the invention. The coarse-grain crystals sediment in the precipitation module 5 and are withdrawn by means of a discharge device 7 connected to the precipitation module 5 via a conduit 53. The precipitation module 5 is connected to a retention module 6 via a conduit 51. Fine grains are retained in the retention module 6 and are prevented from being flushed out of the apparatus 3. The retention module 6 is connected via a further conduit 61 to the precipitation module 5, in such a way that the precipitation module 5 and the retention module 6 in conjunction with the conduits 51 and 61 form a fluidic recirculation loop. The wastewater treated in the inventive apparatus 3 is removed to the outside from the retention module 6 or from the apparatus 3 via a conduit 65. In an appropriate configuration of the apparatus 3, the precipitation module 5 is connected to a conduit 55 and the retention module 6 is connected to a conduit 69 via which gases released in the respective module are removed to the outside.

The discharge device 7 is connected via a conduit 71 to a reservoir for wash water which is not shown in FIG. 2. If necessary, the phosphorus-containing precipitate or coarse grains withdrawn from the precipitation module 5 can be cleaned in the discharge device 7. In addition, the discharge device 7 is connected to a conduit 75 via which spent wash water can be removed to the outside. Phosphorus-containing precipitate which has optionally been cleaned in the discharge device 7 is removed from the discharge device 7 via a conduit 73.

Figure 3:
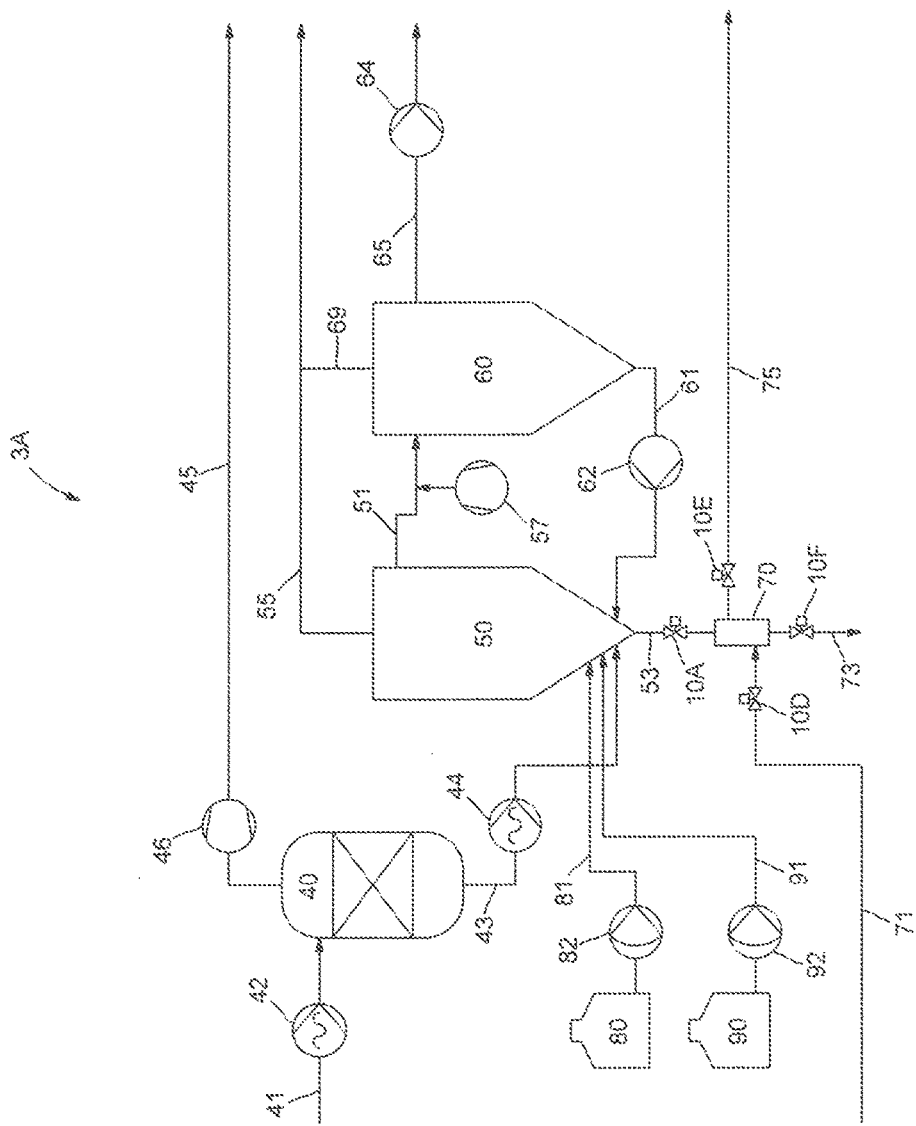
FIG. 3 is a schematic diagram of an exemplary apparatus of the invention with additional details.

FIG. 3 shows a more detailed block diagram of an inventive apparatus 3A, with corresponding reference symbols having the same meaning and function as described above in conjunction with FIG. 2. A gas separator comprises a reduced pressure vessel 40 which is supplied with wastewater from the outside via a conduit 41. In an appropriate embodiment of the apparatus 3A, the conduit 41 is equipped with a fluid drive 42, preferably a screw pump 42. By means of a vacuum pump 46 or a fan 46, a reduced pressure of 20 to 60 kPa is generated in the reduced pressure vessel 40, in order to separate gases dissolved in the wastewater, especially carbon dioxide ($CO_2$), and remove them to the outside via a conduit 45. The separation of carbon dioxide ($CO_2$) raises the pH of the wastewater to a value of 7.5 to 8.5. A precipitation module comprises a crystallization vessel 50. Degassed wastewater is guided from the reduced pressure vessel 40 via a conduit 43 optionally equipped with a fluid drive 42, especially with a screw pump 42, into a lower region of the crystallization vessel 50. A supply unit for a magnesium-containing reagent, for example magnesium chloride ($MgCl_2$), is connected via a conduit 81 to a lower region of the crystallization vessel 50 and comprises a reservoir vessel 80 and a metering device 82, preferably a metering pump 82. Optionally, the apparatus 3A comprises a further supply unit for a basic reagent, for example sodium hydroxide solution (NaOH), which is connected via a conduit 91 to a lower region of the crystallization vessel 50 and comprises a reservoir vessel 90 and a metering device 92, preferably a metering pump 92.

A discharge device for the withdrawal of phosphorus-containing precipitate or coarse grains is arranged beneath the crystallization vessel 50 and connected thereto via a conduit 53. The discharge device comprises a sluice chamber 70 and several valves which are adjustable preferably by electrical or pneumatic means. In the embodiment of the inventive apparatus 3A shown in FIG. 3, the discharge device comprises four valves 10A, 10D, 10E, 10F. The valve 10A is disposed in the conduit 53 that connects the crystallization vessel 50 to the sluice chamber 70. The sluice chamber 70 is connected via a conduit 71 equipped with the valve 10D to a reservoir for wash water which is not shown in FIG. 3. The conduit 71 preferably opens into a lower region of the sluice chamber 70. For the removal of spent wash water from the sluice chamber 70, a conduit 75 equipped with the valve 10E is provided. The conduit 75 is preferably connected to an upper region of the sluice chamber 70. In addition, a lower region of the sluice chamber 70 is connected to a conduit 73 for the withdrawal of phosphorus-containing precipitate. The conduit 73 is equipped with the valve 10F. In the steady-state operation of the inventive apparatus 3A, the valves 10A, 10D, 10E, 10F are closed. According to the mode of operation specified, the sluice chamber 10 is either empty or filled with wash water. At junctures determined for control purposes, the valve 10A is opened, such that phosphorus-containing precipitate, especially coarse grains, optionally mixed with wastewater from the crystallization vessel 50, falls or flows into the sluice chamber 70. At a later juncture likewise determined for control purposes, the valve 10A is closed and then the valves 10D and 10E are opened and the phosphorus-containing precipitate present in the sluice chamber 70 is cleaned with wash water. On completion of cleaning, the valves 10D and 10E are closed and the valve 10F is opened, such that cleaned precipitate blended with wash water remaining in the sluice chamber 70 can trickle or flow away via the conduit 73.

An upper region of the crystallization vessel 50 is connected to an upper region of a sedimentation vessel 60 by fluidic means via a conduit 51.

Preferably, the apparatus 3A comprises an aerator with which fine air bubbles having an equivalent diameter of ≤10 mm, ≤6 mm, ≤2 mm and especially ≤1 mm can be introduced into the wastewater. The fine air bubbles adhere to the organic dry matter present in the wastewater and promote the flotation thereof in the sedimentation vessel 60. According to the invention, the aerator is operated in such a way that the ratio of the volume flow rate of the fine air bubbles introduced into the wastewater to the volume flow rate of the wastewater supplied to the apparatus from the outside is 0.02 to 0.3; 0.2 to 2; 0.2 to 0.6; 0.4 to 0.8; 0.6 to 1.0; 0.8 to 1.2; 1.0 to 1.4; 1.2 to 1.6; 1.4 to 1.8 or 1.6 to 2.0. The aerator comprises a compressor 57 or a fan 57 and one or more outlet nozzles not shown in FIG. 3, the at least one outlet nozzle taking the form of a fine-pore membrane and having pores having a diameter of ≤1000 μm, ≤500 μm and especially ≤100 μm. The fine-pore membrane of the at least one outlet nozzle of the aerator is preferably manufactured from a ceramic or metallic material. The outlet nozzles of the aerator are disposed in the crystallization vessel 50 and/or in the sedimentation vessel 60. Preferably, the at least one outlet nozzle is disposed in the conduit 51 connecting the crystallization vessel 50 to the sedimentation vessel 60.

In a particularly preferred embodiment of the apparatus 3A, the conduit 51 opens into the upper region of the sedimentation vessel 60 at a lower height than an outlet disposed in the upper region of the sedimentation vessel for the removal of wastewater and floating dry matter. The difference in height between the outlet and inlet corresponds to a gradient and serves for improved separation of phosphorus-containing precipitate and floating dry matter.

A lower region of the sedimentation vessel 60 is connected via a conduit 61 by fluidic means to a lower region of the crystallization vessel 50, the conduit 61 being equipped with a fluid drive 62, preferably a screw pump or rotary pump 62. Appropriately, the fluid drive 62 is electronically controllable by closed-loop control. The crystallization vessel 50 and the sedimentation vessel 60 in conjunction with the conduits 51 and 61 form a fluidic recirculation loop, wherein the volume flow rate of the recirculating wastewater can be varied by means of the fluid drive 62 controllable by closed-loop control. Under suitable stoichiometric conditions, phosphorus-containing crystal seeds are formed in the wastewater that circulates between the crystallization vessel 50 and the sedimentation vessel 60, and these grow over a period of 10 to 24 hours to form coarse-grain crystals having an equivalent diameter of 0.4 to 1 mm. The coarse-grain crystals are not entrained by the wastewater flowing upward within the crystallization vessel 50 because the gravity that acts thereon exceeds the Stokes friction force. Accordingly, the coarse-grain crystals sediment in the crystallization vessel 50. The fine-grain crystals having an equivalent diameter of about <0.8 mm, by contrast, are conveyed upward by the upward wastewater flow in the crystallization vessel 50, flushed through the conduit 51 into the sedimentation vessel 60, transported downward in the sedimentation vessel 60 by virtue of the downward wastewater flow and finally recycled into the crystallization vessel 50 via the conduit 61. After sufficient residence time in the wastewater flow that recirculates between the crystallization vessel 50 and the sedimentation vessel 60, the crystals grow to a size having an equivalent diameter of 1 to 2 mm and become sediment in the crystallization vessel 50.

In the sedimentation vessel 60, the fine-grain crystals are separated from the dry matter present in the wastewater, with flotation of a considerable proportion of the dry matter having a density of <1 g/cm$^3$ and accumulation thereof in the upper region of the sedimentation vessel 60 and removal thereof to the outside via a conduit 65. Appropriately, the drain 65 is equipped with a fluid drive 64, especially with a screw pump or rotary pump 64. Preferably, the fluid drive 64 or the screw pump or rotary pump 64 is electronically controllable by closed-loop control. A portion of the dry matter present in the wastewater may have a density of >1 g/cm$^3$. Such dry matter dissolved in wastewater is also referred to by persons skilled in the art as bottom sludge. If present, bottom sludge can be floated by means of the above-described aerator or by injection of fine air bubbles in the sedimentation vessel 60 and removed to the outside.

In an appropriate configuration of the apparatus 3A, the upper region of the crystallization vessel 50 is connected to a conduit 55 and the upper region of the sedimentation vessel 60 to a conduit 69, by means of which gases released in the respective vessel are removed to the outside.

Figure 4:
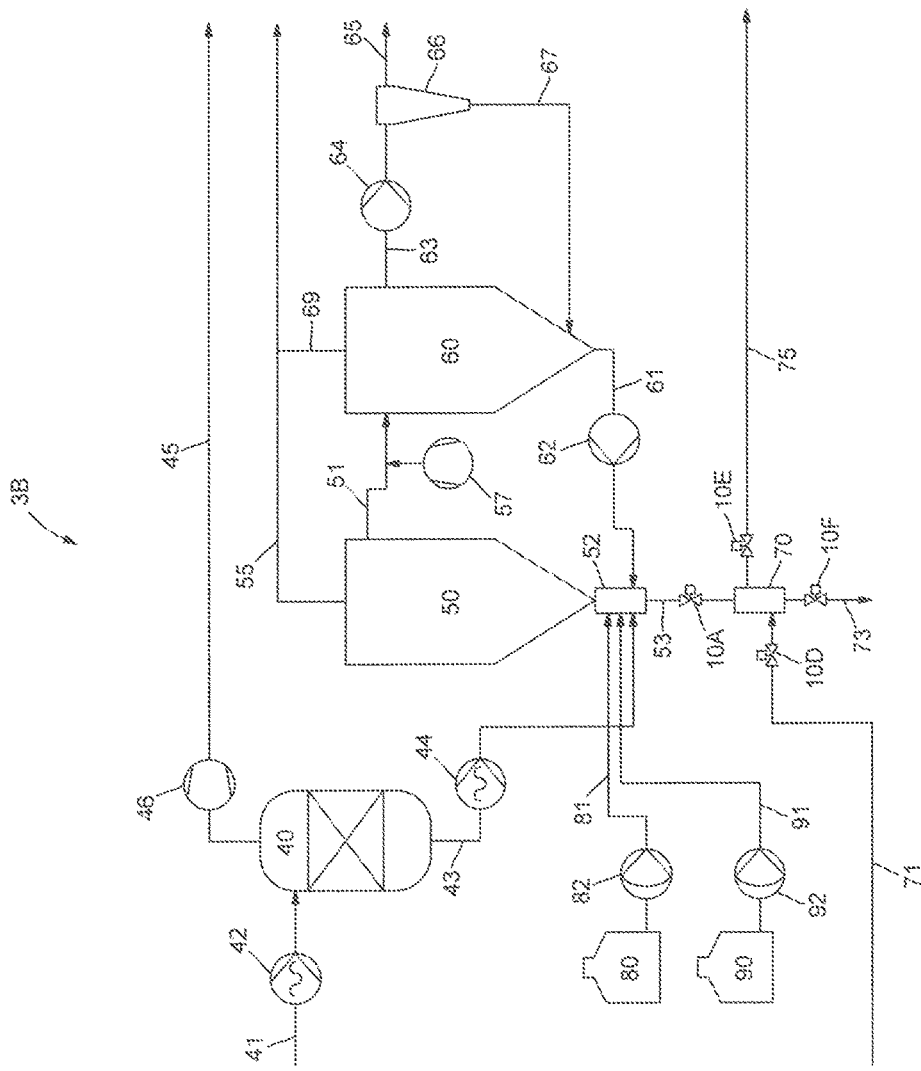
FIG. 4 is a schematic diagram of a different exemplary embodiment of the apparatus of the invention with additional details.

FIG. 4 shows a further inventive apparatus 3B, wherein corresponding reference symbols have the same meaning and function as described above in connection with FIG. 3.

The apparatus 3B differs from the apparatus 3A shown in FIG. 3 in that the precipitation module comprises a mixing vessel 52 arranged beneath and fluidically connected to the crystallization vessel 50. The conduit 43 for the supply of wastewater from the gas separator or the reduced pressure vessel 40, the conduit 81 for the supply of a magnesium-containing reagent from the reservoir vessel 80, optionally the conduit 91 for the supply of a basic reagent from the reservoir vessel 90 and the conduit 61 for the recycling of wastewater and precipitate from the sedimentation vessel 60 are each connected to the mixing vessel 52. The mixing vessel 52 has a smaller volume by a factor of 1000 to 50000 compared to the crystallization vessel 50 and ensures intensive and highly turbulent mixing of the wastewater supplied from the gas separator or reduced pressure vessel 40 and the sedimentation vessel 60 with the magnesium-containing reagent and optionally with the basic reagent.

The apparatus 3B further differs from the apparatus 3A shown in FIG. 3 in that the retention module comprises a hydrocyclone 66 arranged downstream of the sedimentation vessel 60. As shown in FIG. 4, an inlet of the hydrocyclone 66 is connected via a conduit 63 to an outlet disposed in the upper region of the sedimentation vessel 60. Appropriately, a fluid drive 64, especially a screw pump or rotary pump 64, is disposed in the conduit 63 and enables an increase in the flow rate of the wastewater supplied to the hydrocyclone 66. A first outlet of the hydrocyclone 66 for a light wastewater fraction having a high content of dry matter is connected to a conduit 65. Via the conduit 65, the light wastewater fraction separated off in the hydrocyclone 66 is removed to the outside. A second outlet of the hydrocyclone 66 for a heavy wastewater fraction with a high content of phosphorus-containing precipitate is connected via a conduit 67 to a lower region of the sedimentation vessel 60. Via the conduit 67, precipitate separated off in the hydrocyclone 66 is recycled into the sedimentation vessel 60.

The invention further encompasses alternative embodiments of the apparatuses 3A and 3B, which optionally comprise a mixing vessel 52 or a hydrocyclone 66.

Figure 5:
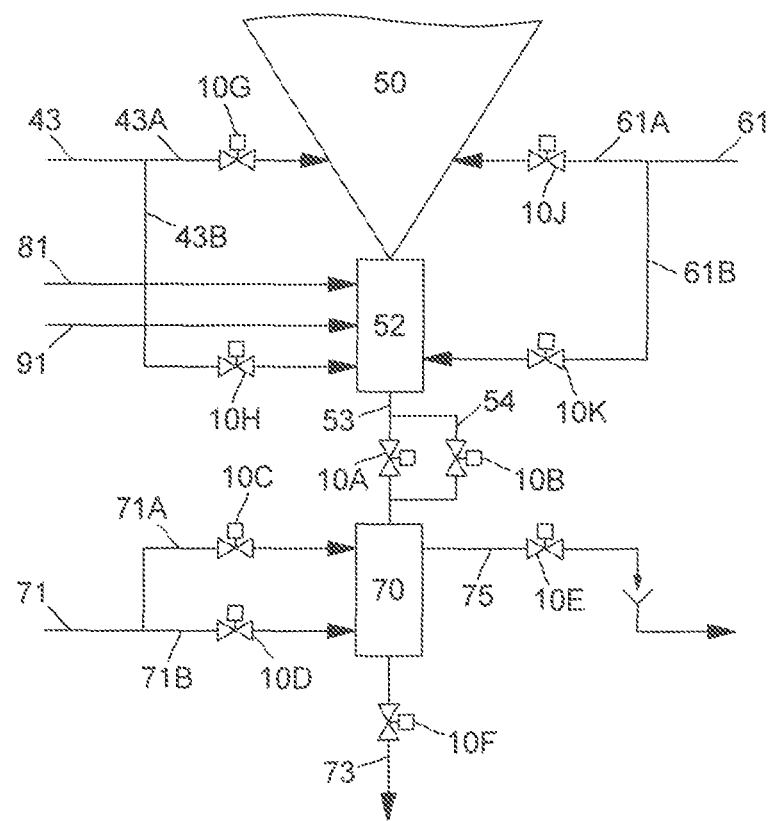
FIG. 5 is a schematic illustration of a discharge device for the withdrawal of phosphorus-containing crystals from the precipitation module.

FIG. 5 shows a partial view of an apparatus of the invention with an advantageous embodiment of a discharge device for the withdrawal of phosphorus-containing precipitate from a precipitation module or a crystallization vessel, wherein corresponding reference symbols have the same meaning and function as described above in conjunction with FIGS. 3 and 4. FIG. 5 shows a partial view of an inventive apparatus 3B—as discussed above in conjunction with FIG. 4—in which the precipitation module, in addition to a crystallization vessel 50, comprises a mixing vessel 52 and further conduits 43A, 43B, 61A, 61B and valves 10G, 10H, 10J, 10K. A conduit 81 for the supply of a magnesium-containing reagent, for example magnesium chloride ($MgCl_2$) and optionally a conduit 91 for the supply of a basic reagent, for example sodium hydroxide solution (NaOH), are connected to the mixing vessel 52. However, the discharge device described hereinafter can be used in an analogous manner in an apparatus 3A—as discussed above in conjunction with FIG. 3—without the mixing vessel 52, in which case the conduits 43B, 61B and valves 10H and 10K are dispensed with and the conduits 81 and optionally 91 are connected to a lower region of the crystallization vessel 50. The mixing vessel 52 or the crystallization vessel 50 is connected via a conduit 53 to a sluice chamber 70 of the discharge device of the invention. The conduit 53 is equipped with a valve 10A and preferably with a bypass conduit 54 with a valve 10B. A conduit 71 serves for supply of wash water from a reservoir, not shown in FIG. 5, to the sluice chamber 70. The conduit 71 branches into the conduits 71A and 71B, each of which is respectively equipped with an adjustable valve 10C and 10D and is respectively connected to an upper region and a lower region of the sluice chamber 70. A lower region of the sluice chamber 70 is connected to a conduit 73 equipped with an adjustable valve 10F. An upper region of the sluice chamber 70 is connected to conduit 75 for the removal of spent wash water. The conduit 75 is likewise equipped with an adjustable valve 10E.

Preferably, the valves 10A, 10B, 10C, 10D, 10E, 10F, 10G, 10H, 10J, 10K are independently electrically or pneumatically adjustable and are connected to an electronic control system not shown in FIG. 5.

In the regular operation of the apparatus, the valves 10G, 10J, 10A, 10B, 10C, 10D, 10E are closed and the valves 10H, 10K are open, in which case the mixing vessel 52 is supplied with wastewater via the conduits 43, 43B and 61, 61B respectively from a gas separator and from a retention module, and the wastewater flows from the mixing vessel 52 upward into the crystallization vessel 50. According to the desired mode of operation, the sluice chamber 70 is empty or filled with wash water. For withdrawal of phosphorus-containing precipitate from the crystallization vessel 50, the valves 10H, 10K are closed and the valve 10A is open. From the mixing vessel 52, precipitate then sinks or flows via the conduit 53 into the sluice chamber 70. After a given time interval, the valve 10A is closed again and the valves 10D, 10E are opened, such that wash water flows via the conduits 71, 71B into the lower region of the sluice chamber 70 and flows away to the outside via the conduit 75 from the upper region of the sluice chamber 70. By means of the wash water which flows from the bottom upward in the sluice chamber, the precipitate is freed of dry matter. After a given time interval, the valves 10D, 10E are closed again and the valves 10C, 10F are opened, such that wash water flows via the conduits 71, 71A into the upper region of the sluice chamber 70. From the upper region of the sluice chamber 70, the wash water flows downward and rinses the cleaned precipitate present therein via the conduit 73 into a collecting vessel, not shown in FIG. 5. After the discharge of the precipitate from the sluice chamber 70, the valves 10C, 10F are closed. According to the desired mode of operation, first the valve 10C and subsequently, with a short time delay, the valve 10F are closed, such that the sluice chamber 70 remains empty. Alternatively, first the valve 10F and subsequently, with a short time delay, the valve 10C are closed, such that the sluice chamber 70 is filled with wash water. In this case, the valve 10B can optionally be opened, such that wash water rises through the bypass conduit 54 into the mixing vessel 52. After a given time interval, the valves 10B, 10C are closed again and the valves 10A, 10F are opened for a given time interval, such that wash water that gets into the mixing vessel 52 flows away via the conduit 53, the sluice chamber 70 and the conduit 73, and precipitate remaining in the conduit 53 is discharged into the collecting vessel. Thereafter, the valves 10A and 10F are closed again and—if desired—the sluice chamber 70 is filled again with wash water by temporary opening of the valve 10C.

During the temporary utilization of the discharge device, the valves 10H, 10K are closed, and the valves 10G, 10J, according to the desired mode of operation, may independently be either open or closed. If the valves 10G, 10J are open, the crystallization vessel 50 is still respectively supplied with waste water from a gas separator or from a retention module.

Figure 6:
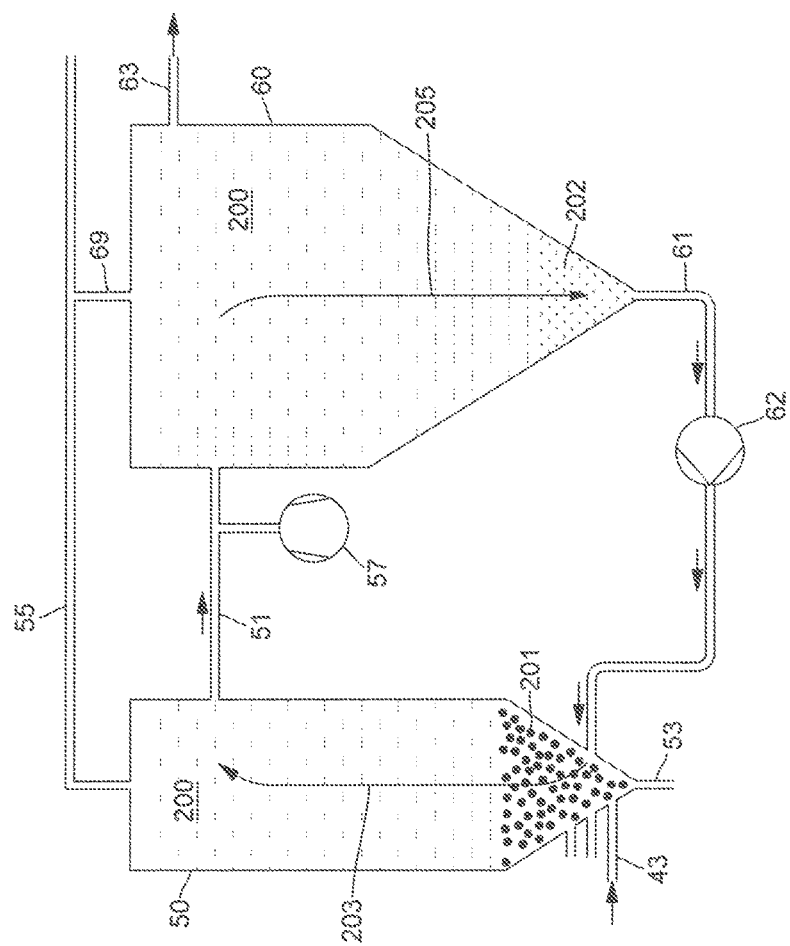
FIG. 6 a schematic section drawing of a crystallization and sedimentation vessel.

FIG. 6 shows another partial view of an apparatus of the invention, wherein corresponding reference symbols have the same meaning and function as described above in connection with FIGS. 3 and 4. An upper region of a crystallization vessel 50 is connected via a conduit 51 to an upper region of a sedimentation vessel 60. A lower region of the sedimentation vessel 60 is connected via a conduit 61 to a lower region of the crystallization vessel 50, the conduit 61 being equipped with a fluid drive 62, preferably a screw pump or rotary pump 62. The crystallization vessel 50, the sedimentation vessel 60 and the conduits 51, 61 form a fluidic recirculation loop for wastewater 200. The wastewater flows upward in the crystallization vessel 50 and downward in the sedimentation vessel 60, as indicated respectively by the arrow 203 and the arrow 205. In the respective flow 203 and 205, fine-grain precipitate 202 is entrained because of friction forces (Stokes principle) and sediments in the lower region of the sedimentation vessel 60. For coarse-grain precipitate 201, gravity is predominant over the Stokes friction force. Accordingly, coarse-grain precipitate 201 is accumulated in the lower region of the crystallization vessel 50. Any coarse-grain precipitate formed in the sedimentation vessel 60 owing to crystal growth is transported into the crystallization vessel 50 as a result of the Stokes friction force, the force of gravity acting in the same direction, and the fluid drive 62. The crystallization vessel 50 and the sedimentation vessel 60 have a lower conical region and an upper cylindrical region, where the maximum cross-sectional area QC or QS is given in each case by the relationship $QC=\pi \cdot DK^2/4$ and $QS=\pi \cdot DS^2/4$, in which DC and DS denote the respective diameters of the cylindrical upper region of the crystallization vessel 50 and of the sedimentation vessel 60. With the illustrative size ratios of FIG. 6, the ratio of the maximum cross-sectional areas QS/QC=4. The ratio of the volume VS of the sedimentation vessel 60 to the volume VC of the crystallization vessel 50, for the illustrative size ratios of FIG. 6, has the value VS/VC~3.1. Accordingly, the ratio of the hydraulic residence time tS in the sedimentation vessel 60 to the hydraulic residence time tC in the crystallization vessel 50 has the value tS/tC~3.1. The volume flow rate (dV/dt) through the crystallization vessel 50 is virtually equal to the volume flow rate through the sedimentation vessel 60. Small, virtually negligible differences between the volume flow rates through the crystallization vessel 50 and the sedimentation vessel 60 are caused by intermittent withdrawal of coarse-grain precipitate 201 from the crystallization vessel 50. With equal volume flow rates, it follows from the continuity equation that the ratio of the minimum flow rate RC in the crystallization vessel 50 to the minimum flow rate RS in the sedimentation vessel 60 is inversely proportional to the ratio of the maximum cross-sectional areas QS/QC, i.e. RC/RS=QS/QC=4. The effect of the higher flow rate RC, compared to RS, in the crystallization vessel is improved fluidization of the coarse-grain precipitate 201, such that dry matter present in the wastewater is flushed out of the precipitate 201 in the upward direction. Conversely, the elevated hydraulic residence time tS compared to tC and the reduced minimum flow rate RS compared to RC in the sedimentation vessel 60 promotes the separation of fine-grain precipitate 202 and dry matter.

Optionally, as elucidated above, an aerator for the introduction of fine air bubbles into the wastewater is provided. The aerator comprises a fan 57 and one or more outlet nozzles that are preferably disposed in the conduit 51. The introduction of fine air bubbles into the wastewater promotes the flotation of dry matter in the wastewater in the sedimentation vessel 60.

Figure 7:
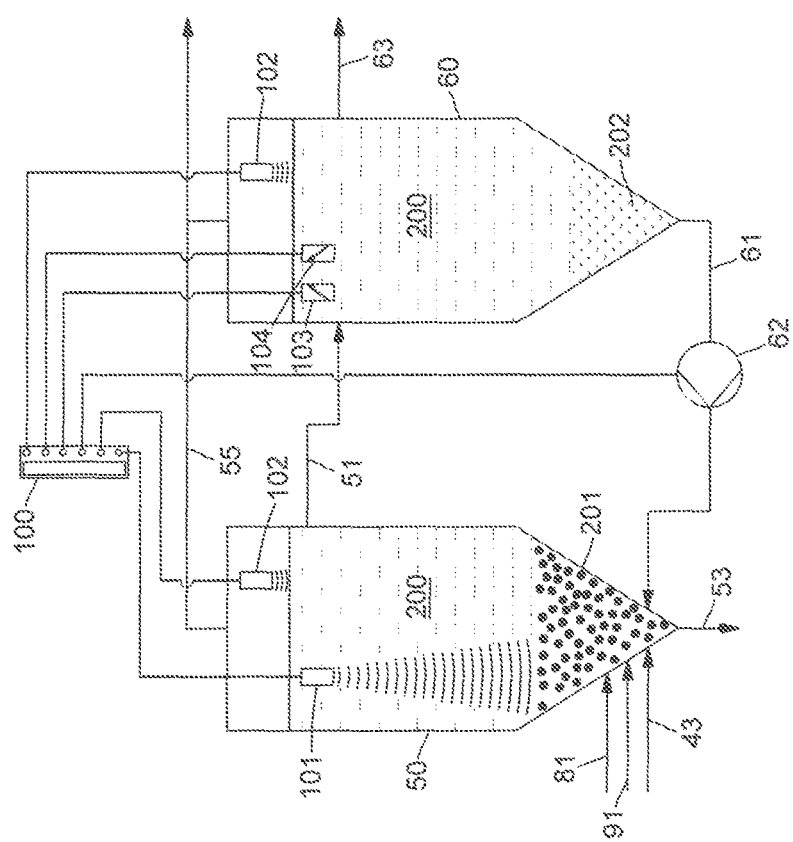
FIG. 7 a scheme of an electronic control system for the apparatus with sensors and a closed-loop controllable fluid drive.

FIG. 7 shows a further partial view of an apparatus of the invention, wherein corresponding reference symbols have the same meaning and function as described above in connection with FIGS. 3 and 4. A crystallization vessel 50 is fluidically connected to a sedimentation vessel 60 via conduits 51 and 61. The crystallization vessel 50 and the sedimentation vessel 60, in conjunction with the conduits 51, 61, form a recirculation loop for wastewater 200, in which case the volume flow rate (dV/dt) of the recirculation can be varied by means of a fluid drive 62 controllable by closed-loop control, preferably a screw pump or rotary pump 62, disposed in the conduit 61. The apparatus further comprises an electronic control system 100 and sensors 101, 102, 103 and 104 connected to the control system. The sensor 101 is disposed in the crystallization vessel 50 and serves for measurement of the position or height of a separation layer between wastewater 200 and a sediment of coarse-grain precipitate 201. The sensor 101 preferably takes the form of an ultrasound sensor and comprises a receiver and transmitter or a transducer for ultrasound waves. The position of the separation layer is measured on the basis of the travel time of ultrasound pulses which are emitted by the sensor 101 and are reflected at the separation layer. On the basis of the travel time and speed of the ultrasound pulses in the wastewater 200, after calibration of the sensor 101, the position of the separation layer is determined electronically. Suitable ultrasound sensors 101 are supplied commercially, for example devices of the NIVUSCOPE® 2 type from NIVUS GmbH or of the POINTEK® ULS200 type from Siemens. Alternatively, the sensor 101 may also take the form of a radar or microwave sensor. Corresponding radar sensors are available from Siemens under the SITRANS® lg200 type designation. Preferably, the sensor 101, as shown in FIG. 7, is positioned such that at least the transmission and reception aperture or even the entire sensor 101 is immersed in wastewater 200. One sensor 102 in each case is disposed in the crystallization vessel 50 and the sedimentation vessel 60 and serves to measure the level height or fill level of the wastewater 200. The two sensors 102 preferably take the form of ultrasound sensors, as described above in connection with the sensor 101. By contrast with sensor 101, however, the sensors 102 are positioned above the surface of the wastewater 200. The surface or level height of the wastewater 200 in the crystallization vessel 50 and the sedimentation vessel 60 is determined by means of the respective sensor 102 on the basis of the travel time of ultrasound pulses reflected by the surface of the wastewater 200 in air.

The sensors 103 and 104 serve respectively to measure the pH and the phosphate content of the wastewater 200 and are preferably disposed in the sedimentation vessel 60. The pH sensor 103 and the phosphate sensor 104 are respectively, for example, devices of the CERAMAX® CPS341D type and of the STAMOLYS® CA71PH type from Endress+Hauser.

The control system 100 takes the form of a programmable logic controller (PLC) or of a PC-based control system (soft-PLC) and comprises one or more inputs for the sensors 101, 102, 103, 104 and one or more outputs for the actuation of fluid drives, pumps, metering devices, valves and mechanical components, for example a conveying screw.

In the context of the invention, the following devices that are shown in FIGS. 3, 4 and 5 valves 10A, 10B, 10C, 10D, 10E, 10F, 10E, 10G, 10H, 10J, 10K;
  fluid drives 42, 44, 62, 64;
  vacuum pumps or fans 46, 57; and/or
  metering devices 82, 92 are each independently connected to the electronic control system 100.

The electronic control system 100 and a control program stored therein are set up or programmed:

to control the volume flow rate of the wastewater supplied to the apparatus from the outside;

to control the volume flow rate of the wastewater removed from the apparatus to the outside;

to control the volume flow rate of the wastewater recycled from the retention module into the precipitation module;

to control the withdrawal of precipitate from the precipitation module with reference to the precipitate content in the crystallization vessel 50;

to control the withdrawal of precipitate from the precipitation module with reference to the phosphate content in the wastewater 200;

to control the withdrawal of precipitate from the precipitation module with reference to the pH of the wastewater 200;

to control the withdrawal of precipitate from the precipitation module with reference to the phosphate content and the pH of the wastewater 200;

to control the supply and metered addition of a magnesium-containing reagent from the reservoir vessel to the precipitation module with reference to the phosphate content and/or the pH of the wastewater 200; and/or to control the supply and metered addition of a basic reagent from the reservoir vessel to the precipitation module with reference to the phosphate content and/or the pH of the wastewater 200.

LIST OF REFERENCE SYMBOLS

1 . . . clarifier for aerobic wastewater treatment
2 . . . digestion vessel or digestion tower for anaerobic wastewater treatment
3 . . . apparatus for phosphorus extraction
4 . . . gas separator
5 . . . precipitation module
6 . . . retention module
7 . . . discharge device for phosphorus-containing precipitate
8 . . . supply unit for magnesium-containing reagent
9 . . . supply unit for basic reagent
10A . . . valve, preferably electrically or pneumatically adjustable
10B . . . valve, preferably electrically or pneumatically adjustable
10C . . . valve, preferably electrically or pneumatically adjustable
10D . . . valve, preferably electrically or pneumatically adjustable
10E . . . valve, preferably electrically or pneumatically adjustable
10F . . . valve, preferably electrically or pneumatically adjustable
10G . . . valve, preferably electrically or pneumatically adjustable
10H . . . valve, preferably electrically or pneumatically adjustable
10J . . . valve, preferably electrically or pneumatically adjustable
10K . . . valve, preferably electrically or pneumatically adjustable
40 . . . reduced pressure vessel
41 . . . inlet conduit for wastewater to be treated
42 . . . fluid drive, especially screw pump
73 . . . conduit for the transfer of wastewater from the gas separator into the precipitation module
43A . . . conduit for the transfer of wastewater from the gas separator into the crystallization vessel
43B . . . conduit for the transfer of wastewater from the gas separator into the mixing vessel
44 . . . fluid drive, especially screw pump
45 . . . conduit for the removal of gas from the gas separator
46 . . . vacuum pump, especially fan
50 . . . crystallization vessel
51 . . . conduit for the transfer of wastewater from the precipitation module into the retention module
52 . . . mixing vessel
53 . . . conduit for the transfer of phosphorus-containing precipitate from the precipitation module into the discharge device
54 . . . bypass conduit for the conduit 53
55 . . . conduit for the removal of gas from the precipitation module
57 . . . aerator fan
60 . . . sedimentation vessel
61 . . . conduit for the recycling of wastewater from the retention module into the precipitation module
62 . . . fluid drive, especially rotary pump
63 . . . conduit for the transfer of wastewater from the sedimentation vessel into a hydrocyclone
66 . . . hydrocyclone
67 . . . conduit for the recycling of a wastewater fraction from the hydrocyclone into the sedimentation vessel
65 . . . outlet conduit for treated wastewater
69 . . . conduit for the removal of gas from the retention module
70 . . . sluice chamber
71 . . . conduit for the supply of wash water to the sluice chamber 70
71A . . . conduit for the supply of wash water into an upper region of the sluice chamber
71B . . . conduit for the supply of wash water into a lower region of the sluice chamber
73 . . . outlet conduit for phosphorus-containing precipitate
75 . . . outlet conduit for wash water
80 . . . reservoir vessel for magnesium-containing reagent
81 . . . conduit for the supply of magnesium-containing reagent from the reservoir vessel 80 into the precipitation module 5
82 . . . metering device, especially metering pump
90 . . . reservoir vessel for basic reagent
91 . . . conduit for the supply of basic reagent from the reservoir vessel 90 into the precipitation module 5
92 . . . metering device, especially metering pump
100 . . . electronic control system
101 . . . separation level sensor
102 . . . fill level sensor
103 . . . phosphate sensor
104 . . . pH sensor
200 . . . wastewater
201 . . . coarse-grain phosphorus-containing crystals
202 . . . fine-grain phosphorus-containing crystals That which is claimed:

1. Apparatus for the extraction of phosphorus from wastewater comprising a precipitation module and a retention module, wherein the precipitation module comprises a crystallization vessel, one or more inlets disposed in a lower region of the precipitation Module and at least one outlet disposed in an upper region of the precipitation module, the retention module comprises a sedimentation vessel, at least one inlet disposed in an upper region of the retention module and at least one outlet disposed in a lower region of the retention module, at least one outlet of the precipitation module is connected to at least one inlet of the retention module and at least one outlet of the retention module is connected to ill at least one inlet of the precipitation module, wherein the volume VS of the sedimentation vessel is greater than/equal to 0.6 times the volume VC of the crystallization vessel (VS≥0.6·VC).

2. Apparatus according to claim 1, wherein the ratio of the volume VS of the sedimentation vessel to the volume VC of the crystallization vessel is greater than/equal to 0.8 (VS/VC≥0.8).

3. Apparatus according to claim 1, wherein the ratio of the volume VS of the sedimentation vessel to the volume VC of the crystallization vessel is greater than/equal to 1.0 (VS/VC≥1.0).

4. Apparatus according to claim 1, wherein the ratio of the volume VS of the sedimentation vessel to the volume VC of the crystallization vessel is greater than/equal to 1.2 (VS/VC≥1.2).

5. Apparatus according to claim 1, wherein a maximum cross-sectional area QS of the sedimentation vessel is greater than/equal to a maximum cross-sectional area QC of the crystallization vessel (QS≥QC).

6. Apparatus according to claim 1, wherein the ratio of the maximum cross-sectional area QS of the sedimentation vessel to the maximum cross-sectional area QC of the crystallization vessel is greater than/equal to 2 (QS/QC≥2).

7. Apparatus according to claim 1, wherein the ratio of the maximum cross-sectional area QS of the sedimentation vessel to the maximum cross-sectional area QC of the crystallization vessel is greater than/equal to 3 (QS/QC≥3).

8. Apparatus according to claim 1, wherein the ratio of the maximum cross-sectional area QS of the sedimentation vessel to the maximum cross-sectional area QC of the crystallization vessel is greater than/equal to 4 (QS/QC≥4).

9. Apparatus according to claim 1, wherein the apparatus comprises a discharge device arranged beneath the precipitation module, for the withdrawal of phosphorus-containing precipitate from the precipitation module.

10. Apparatus according to claim 1, wherein at least one outlet of the retention module is connected via a recycle conduit to at least one inlet of the precipitation module and the recycle conduit is equipped with a fluid drive.

11. Apparatus according to claim 1, wherein the precipitation module has a mixing vessel arranged beneath and connected to the crystallization vessel.

12. Apparatus according to claim 1, wherein the apparatus comprises a gas separator connected via a feed conduit to at least one inlet of the precipitation module.

13. Apparatus according to claim 1, wherein the retention module comprises a hydrocyclone, an inlet of the hydrocyclone is connected to an outlet disposed in an upper region of the sedimentation vessel and an outlet of the hydrocyclone is connected to an inlet disposed in a lower region of the sedimentation vessel, to the recycle conduit or to an inlet of the precipitation module.

14. Apparatus according to claim 1, wherein the crystallization vessel is equipped with at least one sensor for the measurement of the precipitate content in the wastewater.

15. Apparatus according to claim 1, wherein the apparatus comprises an electronic control system.

* * * * *

UNITED STATES PATENT AND TRADEMARK OFFICE
CERTIFICATE OF CORRECTION

PATENT NO. : 10,040,685 B2  
APPLICATION NO. : 15/479470  
DATED : August 7, 2018  
INVENTOR(S) : Ulrich Knörle Page 1 of 1

It is certified that error appears in the above-identified patent and that said Letters Patent is hereby corrected as shown below:

In the Claims

Column 22  
Claim 1, Line 60, delete "Module" insert --module--

Column 23  
Claim 1, Line 1, delete "ill"

Signed and Sealed this  
Sixteenth Day of October, 2018

Andrei Iancu  
*Director of the United States Patent and Trademark Office*